United States Patent
Tanner, Jr. et al.

(10) Patent No.: US 8,423,775 B2
(45) Date of Patent: Apr. 16, 2013

(54) CIRCUMVENTION OF DYNAMIC, ROBUST, EMBEDDED-SIGNAL DETECTION

(75) Inventors: Theodore C. Tanner, Jr., Hollywood, SC (US); Steven E. Swenson, Redmond, WA (US); Martin G. Puryear, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 2271 days.

(21) Appl. No.: 10/676,499

(22) Filed: Sep. 30, 2003

(65) Prior Publication Data
US 2005/0084101 A1 Apr. 21, 2005

(51) Int. Cl.
*H04L 9/32* (2006.01)
(52) U.S. Cl.
USPC .............. 713/176; 382/100; 726/33; 380/204
(58) Field of Classification Search .......................... None
See application file for complete search history.

(56) References Cited

U.S. PATENT DOCUMENTS

| 6,442,285 | B2 | 8/2002 | Rhoads et al. |
| 6,522,769 | B1 * | 2/2003 | Rhoads et al. ................ 382/100 |
| 6,671,806 | B2 * | 12/2003 | Lenoir et al. ................ 713/193 |
| 2002/0107691 | A1 * | 8/2002 | Kirovski et al. .............. 704/270 |
| 2003/0063570 | A1 | 4/2003 | Katayama et al. |

OTHER PUBLICATIONS

Felten et al. "Reading Between the Lines: Lessons from the SDMI Challenge" USENIX, Aug. 13-17, 2001.*
Cox et al. "Some general methods for tampering with waterparks" IEEE , 1998, pp. 1-15.*

* cited by examiner

*Primary Examiner* — Shewaye Gelagay
(74) *Attorney, Agent, or Firm* — Lee & Hayes, PLLC

(57) ABSTRACT

Described herein is a technology facilitating circumvention of dynamic and robust detection of one or more embedded-signals (e.g., watermark, copyright notice, encoded data, etc.) in one or more input carrier signals (e.g., multimedia stream, video stream, audio stream, data, radio, etc.). This abstract itself is not intended to limit the scope of this patent. The scope of the present invention is pointed out in the appending claims.

19 Claims, 6 Drawing Sheets

CIRCUMVENTION OF DYNAMIC, ROBUST, EMBEDDED-SIGNAL DETECTION

TECHNICAL FIELD

This invention generally relates to a technology facilitating circumvention of detection of one or more embedded-signals.

BACKGROUND

As used herein, "intangible goods" is a generic label for electronically stored or transmitted content. Examples of intangible goods include images, audio clips, video, multimedia, software, metadata, and data. An intangible good may be analog or digital. Depending upon the context, an intangible goods may also be called a "digital signal," "content signal," "digital bitstream," "media signal," "digital object," "object," and the like.

Intangible goods are often distributed to consumers over private and public networks—such as Intranets and the Internet. In addition, these goods are distributed to consumers via fixed processor-readable media, such as a compact disc (CD-ROM), digital versatile disc (DVD), soft magnetic diskette, hard magnetic disk (e.g., a preloaded hard drive), portable media players, and flash memory cards. Furthermore, goods are distributed via communications streams such as those originating from a client such as an instant messenger or another audio/visual chat application.

Unfortunately, it is relatively easy for a person to pirate the content of intangible goods at the expense and harm of the content owners—which include the content author, publisher, developer, distributor, etc. The content-based industries (e.g., entertainment, software, audio and/or video, film, etc.) that produce and distribute content are plagued by lost revenues due to piracy.

Embedded-Signals

Embedding one or more signals in a carrier signal (e.g., intangible goods) is one of the most promising techniques for protecting the content owner's rights of intangible goods. This embedded-signal is commonly called a "watermark" and the embedding process is commonly called "watermarking."

Generally, watermarking is a process of altering the intangible good such that its perceptual characteristics are preserved. For example, a "watermark" is a pattern of bits or signal stream inserted into a digital or analog good that may be used for many purposes, such as identifying the content owners and/or the protected rights.

A watermark embedder (i.e., encoder) is used to embed a watermark into intangible goods. A watermark detector is used to detect the existence of the watermark in the watermarked intangible goods and possibly identifying that watermark.

Watermark detection is often performed in real-time even on small electronic components. Such a "real-time" detector is also often called a "dynamic detector." Generally, this means that the detector is attempting to detect a watermark in intangible goods as the goods are being consumed (e.g., played, presented, stored, and such). For example, if the intangible good is an audio signal, the detector attempts detection while the audio signal is being played. If, for example, the intangible good is a video signal, the detector attempts detection while the video signal is being played.

Such dynamic watermark detection is often a very expensive operation (in terms of computing resources). If there are multiple input streams, then conventionally there are multiple dynamic watermark detection modules running (i.e. one per input stream). The expense in computing resources increases with each watermark detection module invoked to operate on an input stream.

Those of ordinary skill in the art are familiar with conventional techniques and technology associated with watermarks, watermark embedding, and watermark detecting.

Common Attacks

A watermark is typically designed to survive a wide variety of signal processing, (e.g., compression, equalization, D/A and A/D conversion, recording on analog tape, color correction, and so forth). It is also typically designed to survive malicious attacks that attempt to remove the watermark or obscure it (e.g., changes in time and frequency scales, pitch shifting, and cut/paste editing).

Unlike a physical watermark in paper, a digital watermark in a digital picture, document, video, or audio signal is relatively easy to defeat. Many academic and research institutions have ascertained that watermarks can be easily removed from the content without much effort. The more robust a system is, the more susceptible it is to an attacker identifying the watermark within the content. Some basic attacks are:

Averaging. An averaging attack examines a large number of images or videos that use the same watermark for a similar detectable mark. The watermark appears as a common deviation across the images, which permits an attacker to extract the watermark from the files fairly accurately.

Surgical. A surgical attack uses exact prior knowledge of the watermarking algorithm and inner workings of the watermarking scheme to recover the original piece of content by removing only the part that represents the watermark. (It is possible to create a software crawler to automate this process.) The main advantage of such an attack is that it does not diminish the quality of the resulting content.

Since the watermark is subject to both naturally occurring environmental factors and malicious attacks, the watermark embedding and detection process is typically designed to be resilient to attacks. This quality is often called "robustness."

The standard set of example attacks is itemized in the Request for Proposals (RFP) of IFPI (International Federation of the Phonographic Industry) and RIAA (Recording Industry Association of America). The RFP encapsulates the following security requirements:

two successive D/A and A/D conversions,
data reduction coding techniques such as MP3 or WMA,
adaptive transform coding (ATRAC),
adaptive subband coding,
Digital Audio Broadcasting (DAB),
Dolby AC2 and AC3 systems,
applying additive or multiplicative noise,
applying a second Embedded Signal, using the same system, to a single program fragment,
frequency response distortion corresponding to normal analogue frequency response controls such as bass, mid and treble controls, with maximum variation of 15 dB with respect to the original signal, and
applying frequency notches with possible frequency hopping.

SUMMARY

Described herein is a technology facilitating circumvention of dynamic and robust detection of one or more embedded-signals (e.g., watermark, copyright notice, encoded data, etc.) in one or more input carrier signals (e.g., multimedia stream, video stream, audio stream, data, radio, etc.).

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, thereby better explain the present invention. Furthermore, for ease of understanding, certain method steps are delineated as separate steps; however, these separately delineated steps should not be construed as necessarily order dependent in their performance.

The following description sets forth one or more exemplary implementations of Circumvention of Dynamic, Robust, Embedded-Signal Detection that incorporate elements recited in the appended claims. These implementations are described with specificity in order to meet statutory written description, enablement, and best-mode requirements. However, the description itself is not intended to limit the scope of this patent.

The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of Circumvention of Dynamic, Robust, Embedded-Signal Detection may be referred to as an "exemplary detection circumvention."

Incorporation by Reference

The following co-pending patent application is incorporated by reference herein: U.S. patent application Ser. No. 10/676,247, entitled "Centralized Detector of Dynamic, Robust, Embedded-Signals" filed on Sep. 30, 2003, and assigned to the Microsoft Corporation.

Introduction

Figure 6:
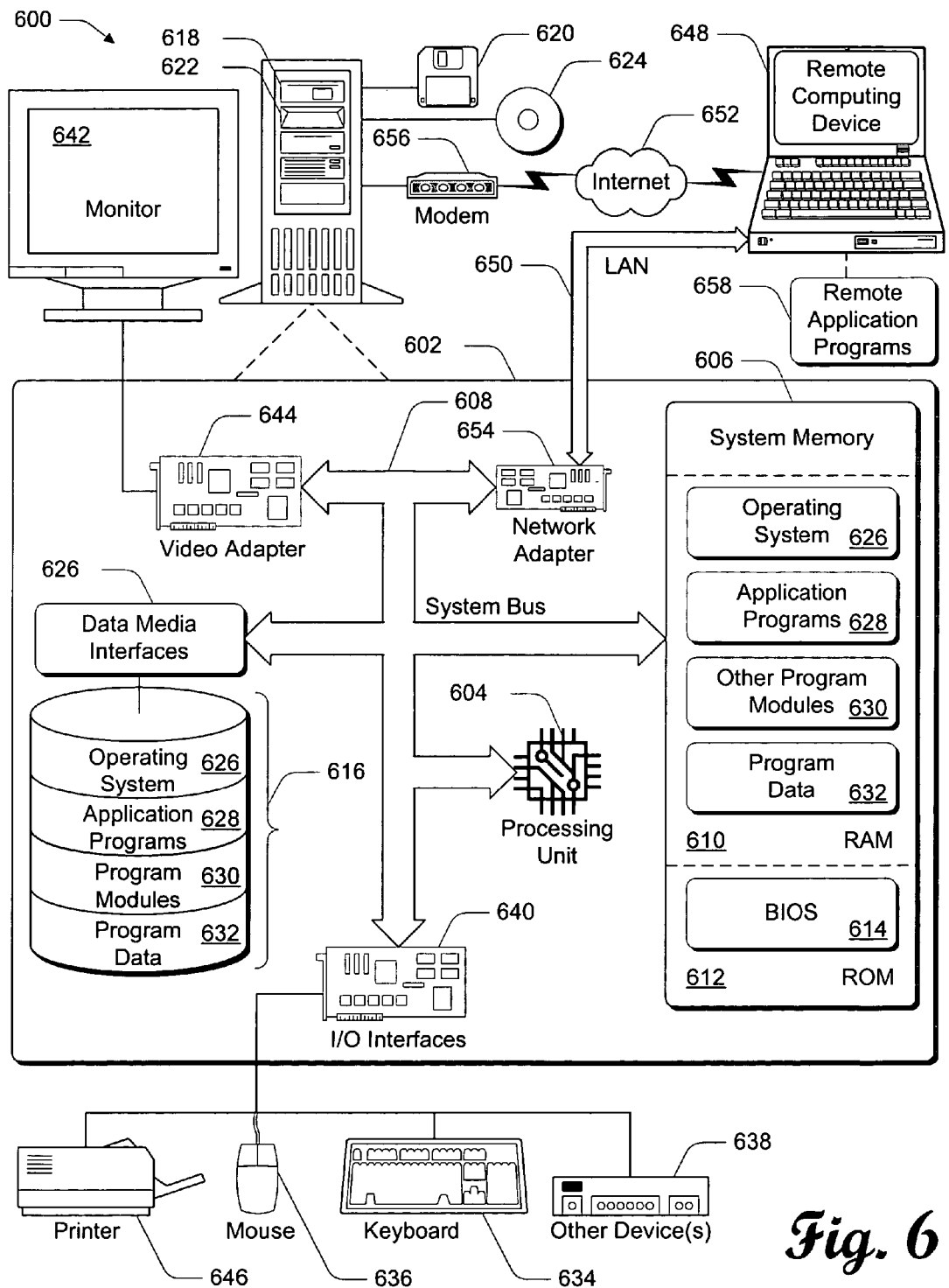
FIG. 6 is an example of a computing operating environment capable of (wholly or partially) implementing at least one embodiment described herein.

The one or more exemplary implementations, described herein, of the present claimed invention may be implemented (in whole or in part) by a computer-executable circumvention module 160 as part of a computer client 126 (of FIG. 1) and/or as part of a computing environment like that shown in FIG. 6.

The exemplary detection circumvention employs one or more techniques (alone or in combination) that are configured to thwart an embedded-signal detector (e.g., a watermark detector). In doing so, it reduces the likelihood of detection of an embedded-signal (e.g., a watermark) in an input carrier signal. Put another way, with the exemplary detection circumvention, it is less likely that a watermark detector will detect the existence of a watermark in intangible goods.

Typically, when a system does not detect an embedded-signal, then it assumes that there is no embedded-signal (e.g., watermark) in the intangible goods (e.g., carrier signal).

With a dynamic detector, the signal is being consumed (e.g., played, stored, presented, etc.) while detection is being performed. If a watermark is detected, the enforcement modules on the computer may halt consumption of the incoming stream. However, with circumvention, the dynamic detector may fail to detect an otherwise present watermark in the incoming stream until all of or a substantial portion of the stream has been consumed.

With such circumvention, a digital pirate may, for example, enjoy licensed digital music or video without purchasing the right to do so. Since the detector is unable to locate the copyright-protection watermark in a digital music stream, it assumes that no license is required to consume the stream.

The exemplary detection circumvention employs one or more of these techniques (alone or in combination) that are configured to circumvent a dynamic, robust, embedded-signal detection system:

An input-location and -interference circumvention technique: This technique finds the input stream of the embedded-signal detector and interferes with it by modifying its reception or introducing a countersignal (e.g., noise) to confuse the detector.

A resource starvation circumvention technique: This technique starves the computing system's central processor of its available resources by keeping a high priority task running at all times that a detectable signal is being consumed (e.g., playing).

An input-overload circumvention technique: This technique overloads the computing system with so many innocuous inputs that it does not have an opportunity (before the subject input signal is consumed) to determine which input signal may have a detectable embedded-signal.

A decoy circumvention technique: This technique distracts the computing system by introducing an additional input that is known to be a watermark offender. Depending on the implementation of the watermark detector, it could choose the first watermark signal it found in the tree, and this decoy could be chosen, leaving the real targeted signal to be played without obstruction. This assumes that the decoy signal plays for the duration of the targeted signal.

Rather than attempting to directly attack the incoming watermarked signal, the exemplary detection circumvention manipulates the environment within which the dynamic, robust, embedded-signal detector operates so that the detector is less able to detect the watermark in a timely manner.

The inventors are aware that publication of this issued patent may educate unscrupulous souls on the ways to circumvent a watermark. However, instead of education, the inventors' purpose here is to discourage such unscrupulous souls. If digital pirates actually use, make, sell or offer for sale the particular circumvention techniques described herein, then they are subject to patent infringement enforcement. Furthermore, with publication, the relevant industries are on-notice of these techniques and will surely take action to counteract them.

Production and Distribution System Employing Embedded-Signals

Figure 1:
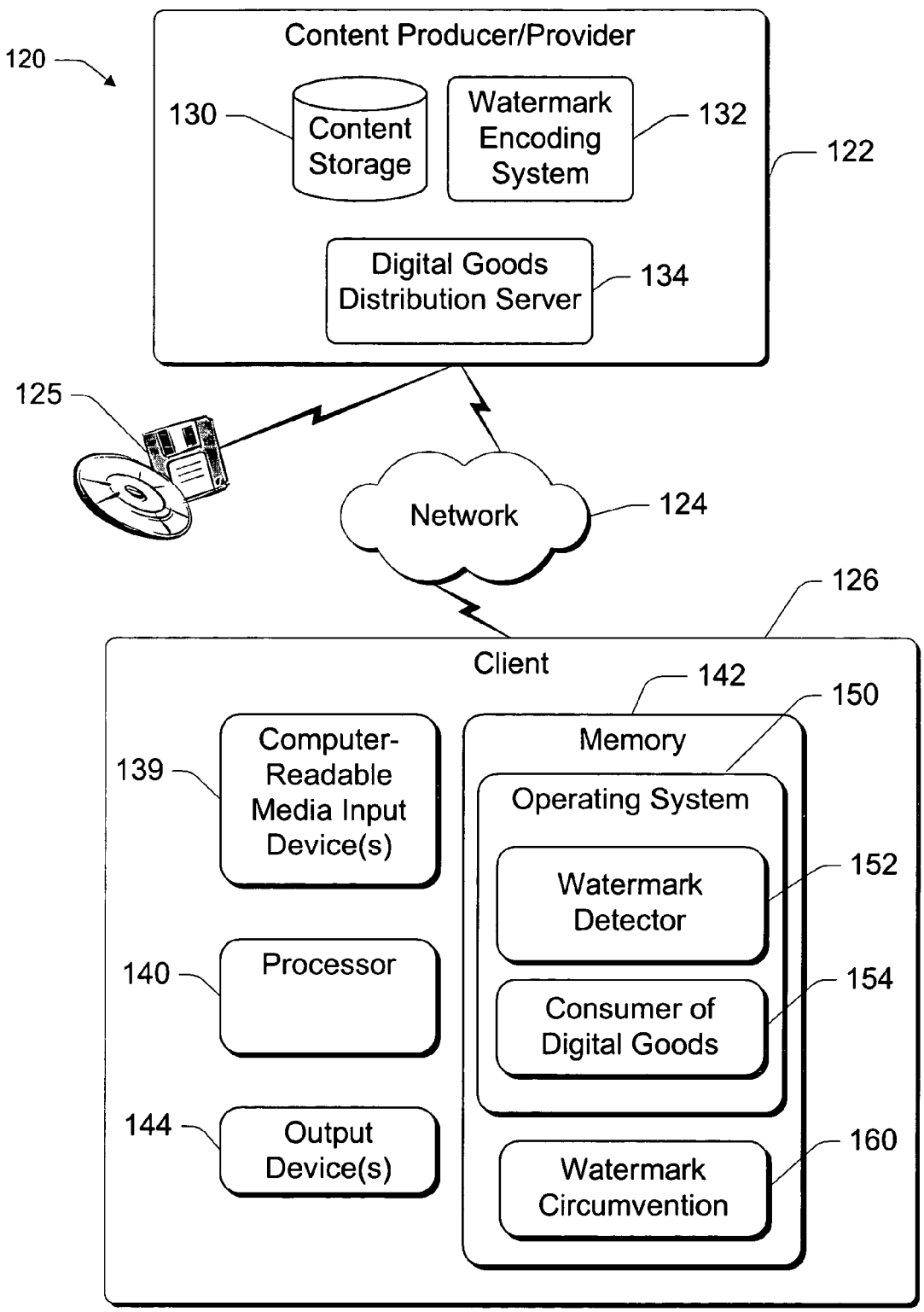
FIG. 1 is a block diagram showing a production and distribution system in which a content producer/provider watermarks intangible goods and subsequently distributes that watermarked intangible goods to a client. It also shows the computer client capable of (wholly or partially) implementing at least one embodiment described herein.

FIG. 1 shows an example of a content production and distribution system 120 having a content producer/provider 122 that produces original content (e.g., original music) and distributes the content over a network 124 to the computer client 126 or via processor-readable media 125, such as a CD-ROM.

The content producer/provider 122 has a content storage 130 to store intangible goods (e.g., multimedia streams) of original content. The content producer 122 has a watermark encoding system 132 to embed the intangible goods with a watermark. That watermark may uniquely identify the content with the content producer/provider 122. The watermark encoding system 132 may be implemented as a standalone process or incorporated into other applications or an operating system.

The watermark encoding system 132 applies the watermark to intangible goods from the content storage 130. The watermark may, for example, identify the content producer 122 by providing a signature that is embedded in the digital.

The content producer/provider 122 has a distribution server 134 that streams the watermarked intangible goods over the network 124 (e.g., the Internet). Alternatively, it stores the watermarked intangible goods onto processor-readable media 125 (e.g., floppy disk or CD-ROM).

The client computer 126 is equipped with a processor 140, a memory 142, a processor-readable media reader device 139 (for reading, for example, CD-ROMs), and one or more output devices 144 (e.g., speakers, digital media writer, etc.).

The memory 142 stores an operating system 150 (such as a Microsoft® Windows XP® operating system), which executes on the processor. The client computer 126 may be embodied in a many different ways, including a computer, a handheld entertainment device, a set-top box, a television, an audio appliance, video appliance, and so forth.

Typically, the detector is a software module and it is typically incorporated into the operating system. Alternatively, the detector may be implemented in hardware which is called by the operating system 150.

Another module may be a intangible goods consumer 154, which is designed to receive and consume the incoming intangible goods. Of course, the consumer 154 does not need to be a part of the operating system. The consumer 154 may be, for example, in the case of multimedia, a multimedia player to facilitate play of multimedia content through the output device(s) 144 (e.g., sound card, speakers, storage unit, etc.). It may be, for example, a third-party driver for a external device. If the watermark is present, the computing device can detect its presence and identify its associated information.

Alternatively, block 154 could be a digital transceiver that conveys an omnibus mixed signal to a receiver external to the client computer.

The operating system 150 and/or processor 140 may be configured to enforce certain rules imposed by the content producer/provider (or copyright owner). For instance, the operating system and/or processor may be configured to reject fake or copied content that does not possess a valid watermark. In another example, the system could play unverified content with a reduced level of fidelity or only via analog outputs.

The client computer 126 may also have the processor-readable circumvention program module 160 running on it. This module may be stored within the memory 142 and run by the processor 140. This module may be an example of an implementation of the exemplary detection circumvention.

Although the circumvention program module 160 is illustrated as a software module, it may be implemented as a device that is solely hardware or a combination of both hardware and software.

Exemplary Input-Location and -Interference Circumvention

The circumvention program module 160 of FIG. 1 may be an example of an implementation of the input-location and -interference circumvention technique. This technique finds the input stream of the embedded-signal detector and interferes with it by modifying its reception or introducing a countersignal (e.g., noise) to confuse the detector.

Figure 2:
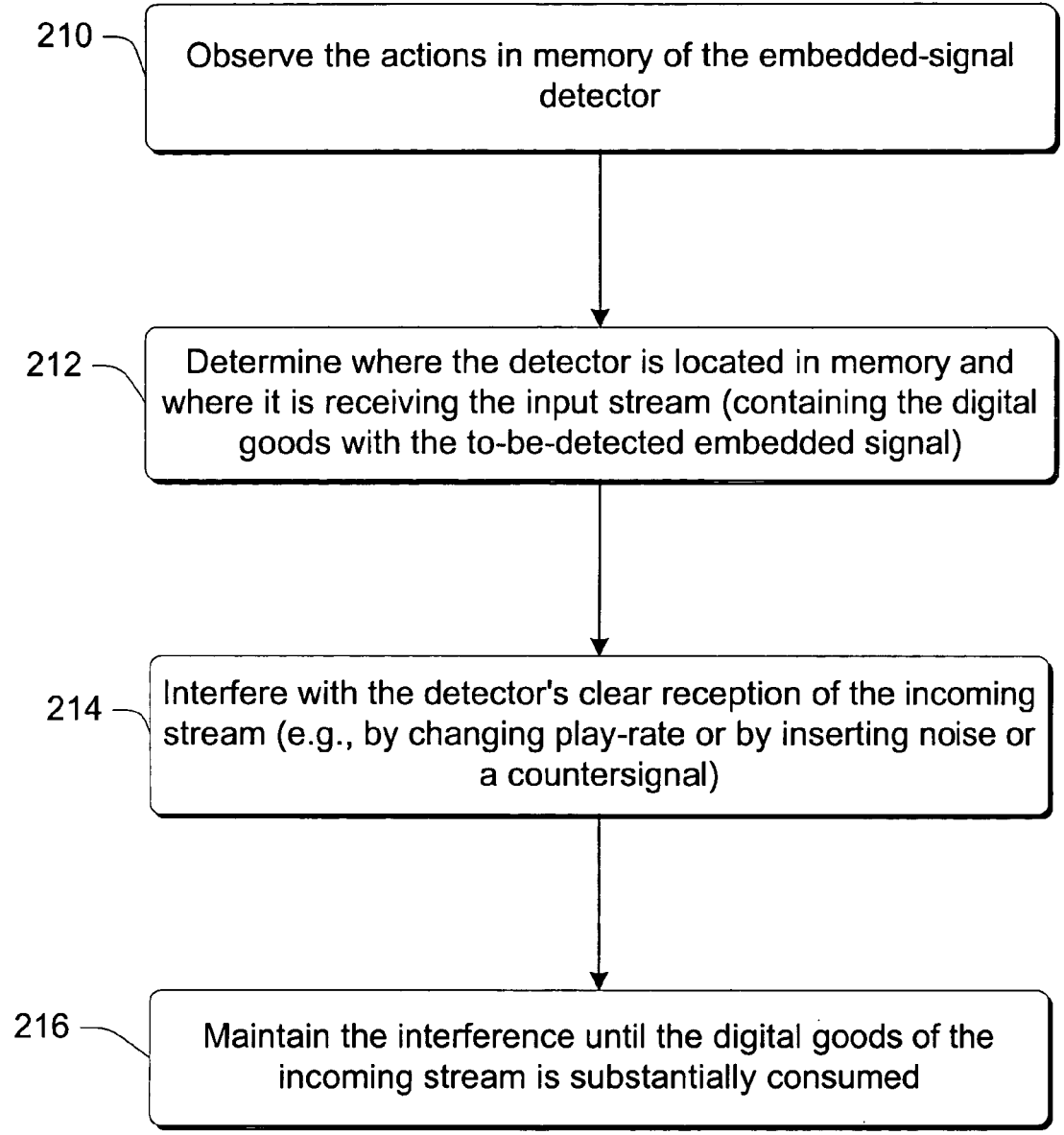
FIG. 2 is a flow diagram showing a methodological implementation described herein.

FIG. 2 shows a methodological implementation of the exemplary detection circumvention performed by the circumvention program module 160 (or some portion thereof). This methodological implementation may be performed in software, hardware, or a combination thereof.

At 210 of FIG. 2, the circumvention program module 160 observes the actions in memory of the detector 152. The module 160 watches where a program (e.g., the detector 152) is running in memory 142 and how the memory allocation changes.

For example, the module 160 may find the detector by locating it by name in a list of loaded libraries in the system. Once the detector is found, the publicly available calls may be hooked so that the module 160 can find the call that passes audio data into the detector.

It might do this by examining the memory of various parameters to find a known signal. This may only need be done one time since once they are determined, the inputs and call entry points do not change. The module may just locate from where in RAM the detector is executing.

At 212, it determines where the detector 152 is located in the memory and where is receiving an input stream. Since it is the detector receiving the stream, it is presumed that the stream contains the intangible goods which are subject to watermark detection.

At 214, the circumvention module 160 interferes with the detector's 152 clear reception of that incoming stream.

At 216, the circumvention module 160 maintains the interference until the incoming intangible goods is fully consumed (e.g., recorded, played, stored, etc.) or until a significant portion is consumed.

Interference by Changing Incoming Rate

The circumvention module 160 may produce the interference (of block 214) by changing the incoming rate for the stream. For example, if incoming stream is an audio clip, it may change the "play-rate" of a multimedia stream.

The play-rate may be changed with a rate converter. Audio sample rate conversion and video frame rate conversion is a well known technique in the industry. The use of a variable speed rate converter would allow the module 160 to vary the rate of the audio or video going in to the detector to confuse it.

Changing the incoming rate for the stream may result in the detector failing to detect the embedded-signal in the incoming intangible goods because the detector is not receiving the incoming steam at a constant rate.

Interference by Introducing Countersignal

Alternatively still, it may interfere with the detector's 152 clear reception of that incoming stream by writing a countersignal to the point in memory where the detector is receiving the incoming signal; thereby, confusing the detector. This countersignal may be simply noise. Alternatively, it may be a countersignal that is specifically produced in response to the actual input stream. The countersignal may be any signal that would cause the modification of the incoming stream (with the subject intangible goods) such that the detector would not detect the embedded signal.

For example, the countersignal may be random noise. It might just be silence, or some other non-watermarked audio that completely replaces the stream (e.g., video or audio) going into the detector.

When the countersignal is mixed with the incoming stream, it is likely to make it very difficult for the detector to effectively detect the embedded-signal in the incoming intangible goods.

Exemplary Resource-Starvation Circumvention

The circumvention program module 160 of FIG. 1 may be an example of an implementation of the resource starvation circumvention technique. This technique starves the computing system's central processor of its available resources by keeping a high priority task running at all times that a detectable is signal being consumed (e.g., playing).

Figure 3:
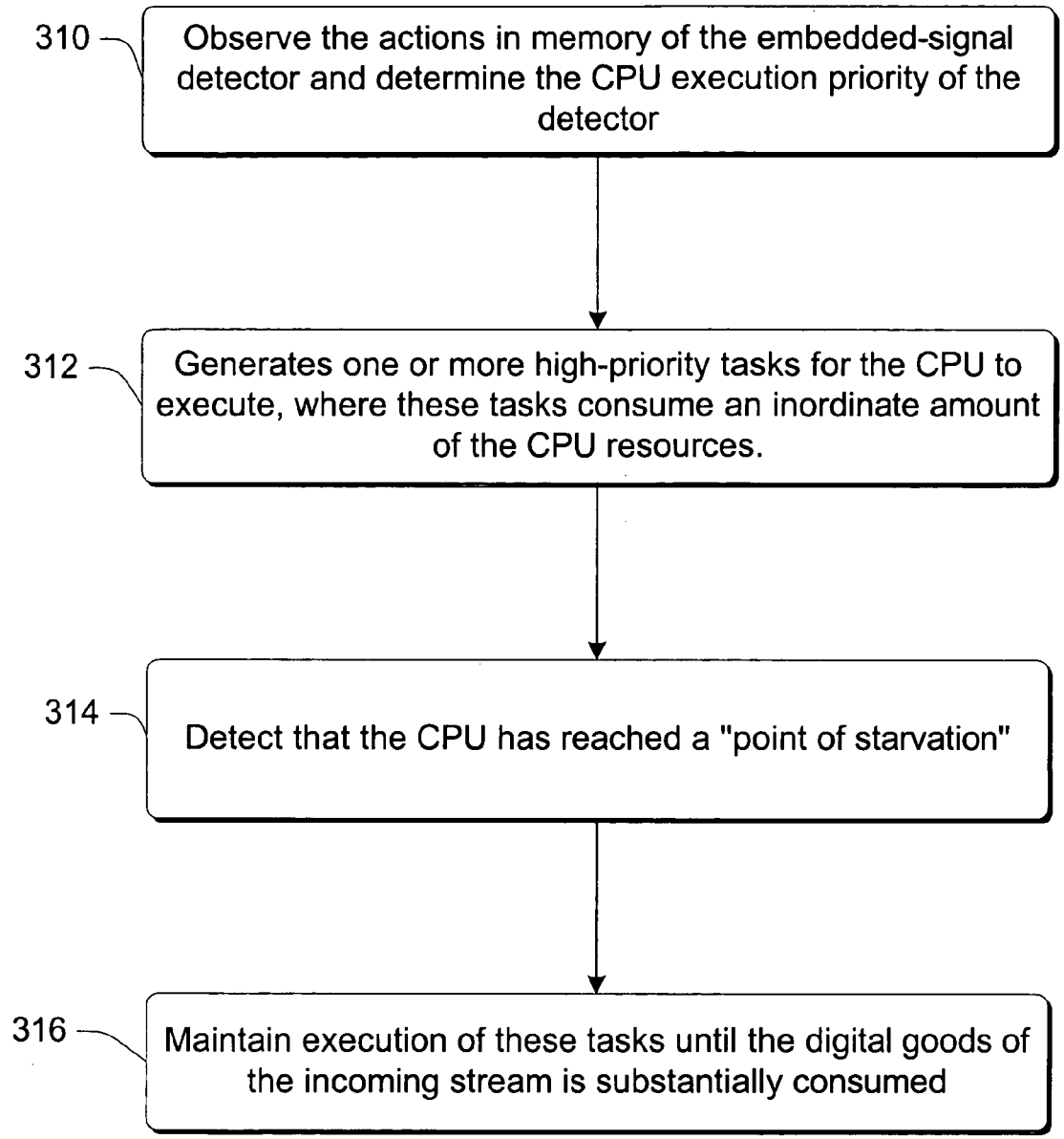
FIG. 3 is a flow diagram showing a methodological implementation described herein.

FIG. 3 shows a methodological implementation of the exemplary detection circumvention performed by the circumvention program module 160 (or some portion thereof). This methodological implementation may be performed in software, hardware, or a combination thereof.

At 310 of FIG. 3, the circumvention program module 160 observes the actions in memory of the detector 152. It determines if the detector is receiving an subject signal for detection. It also determines the CPU execution priority of the detector.

At 312, the circumvention module 160 generates one or more high-priority tasks for the processor 140 to execute. The priority of these tasks is greater than the priority of the detector. These tasks are effectively part of the circumvention module 160.

These tasks may be program modules having infinite or nearly infinite loops (via a DLL, for example) that require an inordinate amount of the CPU's attention and resources. For example, the resource may be the CPU itself—the ability of the computer to execute the detector. This causes "CPU starvation."

CPU starvation is when some process (in this case the malicious module 160) executes more than its fair share of the time. By so doing, other processes such as the detector are "starved" of CPU time. In other words, the other computer programs do not get to execute. Since the detector doesn't get a chance to run on the CPU, it cannot do its job of detecting the watermark.

At 314, the circumvention module 160 detects that the CPU has reached a "point of starvation." The module 160 may detect if it is using all the CPU.

On a multiple processor machine, the module 160 may determine how many threads it needs to create so that it can starve all CPUs and thus crowd out the detector. On a typical multiple processor machine, one thread only runs on one processor. Thus if there were two processors, and module 160 only created one thread that ran all the time (because it is highest priority), only 50% of the total CPU resources could be used up, and the module 160 wouldn't achieve its goal of starving the detector. Thus the module 160 would have to detect that it wasn't yet using all the CPU and create additional high priority threads until it achieved 100% CPU usage.

At 316, the circumvention module 160 maintains the execution of these high priority tasks until the incoming intangible goods is fully consumed (e.g., recorded, played, stored, etc.) or until a significant portion is consumed.

Simply maintaining this overall CPU starvation condition greatly limits the resources available to the detector 152. Therefore, the detector is less likely to detect an embedded-signal in the incoming stream (of the intangible goods) before all or a significant portion of the goods are consumed.

Alternatively, this technique may be combined with the input-location and -interference circumvention technique so that in response to a CPU starvation condition, these high-priority tasks interfere with incoming signal to the detector. Since their priority is greater than that of the detector, they will be able to effectively interfere with the incoming signal to the detector. These tasks may send a false signal (e.g., a countersignal) to confuse the detector or modify the "play-rate" of the incoming stream.

Exemplary Input-Overload Circumvention

The circumvention program module 160 of FIG. 1 may be an example of an implementation of the input-overload circumvention technique. This technique starves the computing system's central processor of its available resources by keeping a high priority task running at all times that a detectable is signal being consumed (e.g., playing).

Figure 4:
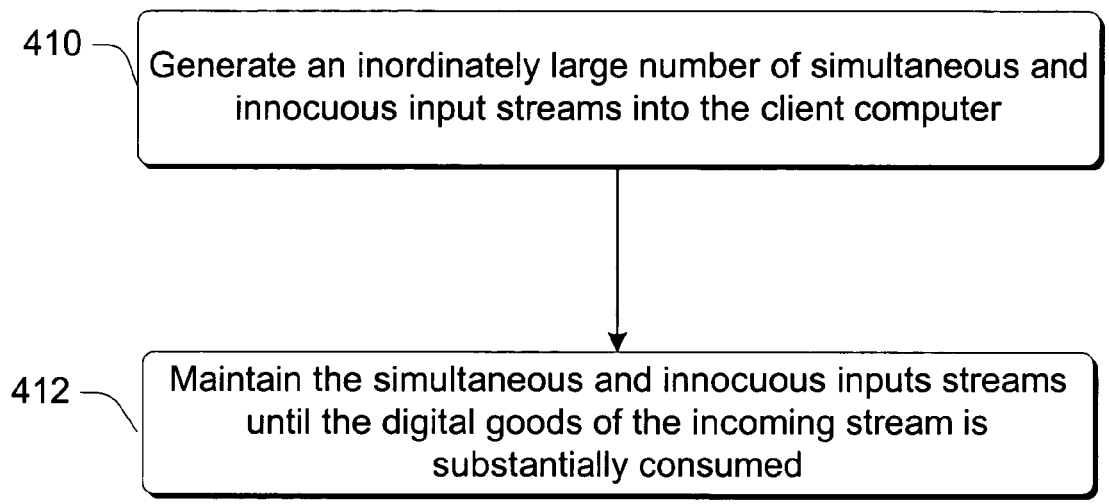
FIG. 4 is a flow diagram showing a methodological implementation described herein.

FIG. 4 shows a methodological implementation of the exemplary detection circumvention performed by the circumvention program module 160 (or some portion thereof). This methodological implementation may be performed in software, hardware, or a combination thereof.

At 410 of FIG. 4, the circumvention program module 160 generates an inordinately large number of simultaneous and innocuous input streams into the client computer 126. For example, the module may open up 1000 channels of input multimedia. The actual threshold for an "inordinately large number" would most likely be determined by the creator of module 160 by experimentation. A reasonable number would be picked that would be effective on most target systems, and that would be part of the program instructions for module 160.

The module may accomplish this by calling application program interfaces (APIs) to perform actions, such as playing an multimedia stream. The module 160 would just use an API call to start one stream playing, then repeat the call.

This effectively overloads the system with more inputs than the detector 152 has time to locate to subject signal and perform effective detection on it. The detector 152 performs its detection process on all incoming data streams. Since the streams are being consumed (e.g., played, recorded, stored, etc.) in real-time with the detection, it is less likely that the detector 152 will process the actual subject stream (amongst the numerous dummy streams) and find the embedded-signal therein the stream before the incoming stream is consumed.

At 412, the circumvention module 160 maintains the simultaneous and innocuous input streams until the incoming intangible goods is fully consumed (e.g., recorded, played, stored, etc.) or until a significant portion is consumed.

Exemplary Decoy Circumvention

The circumvention program module 160 of FIG. 1 may be an example of an implementation of the decoy circumvention technique. This technique distracts the computing system by introducing an additional input that is known to be a watermark offender. Depending on the implementation of the watermark detector, it could choose the first watermark signal it found in the tree, and this decoy could be chosen, leaving the real targeted signal to be played without obstruction. This assumes that the decoy signal plays for the duration of the targeted signal.

Figure 5:
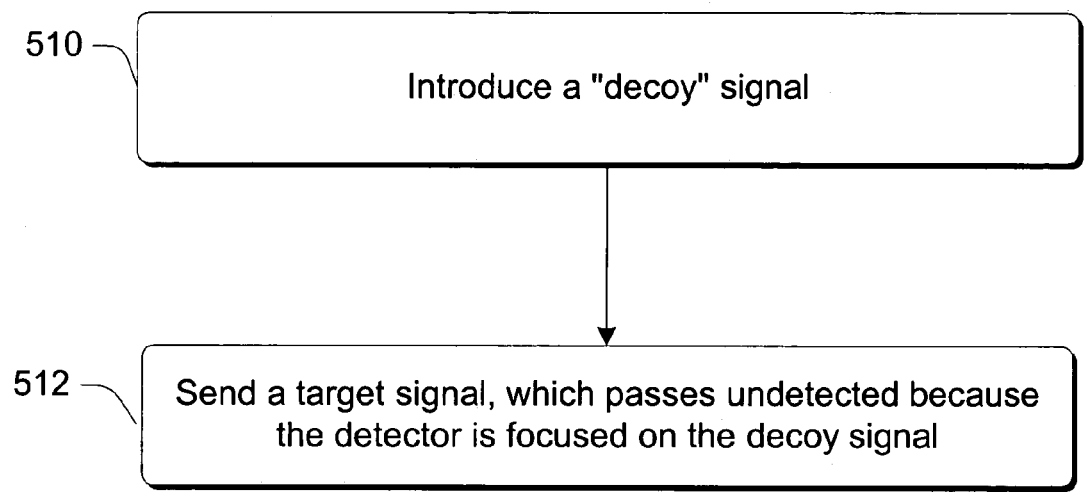
FIG. 5 is a flow diagram showing a methodological implementation described herein.

FIG. 5 shows a methodological implementation of the decoy circumvention technique performed by the circumvention program module 160 (or some portion thereof). This methodological implementation may be performed in software, hardware, or a combination thereof.

At 510 of FIG. 5, the circumvention program module 160 introduces a "decoy" signal (which is a known tampered signal) as one of the multiple input signals. It does this hoping to attract the attention of the watermark detector. If the CWD is able to focus on only one tampered signal at a time, the detector will focus its attention on the decoy signal. It may take action against this decoy (such as muting or blanking the signal).

At 512, the circumvention module 160 sends the target signal as one of the multiple signals. Since the detector is only focused on the decoy signal, this targeted signal passes through undetected and undeterred.

Exemplary Computing System and Environment

FIG. 6 illustrates an example of a suitable computing environment 600 within which an exemplary detection circumvention, as described herein, may be implemented (either fully or partially). The computing environment 600 may be utilized in the computer and network architectures described herein.

The exemplary computing environment 600 is only one example of a computing environment and is not intended to suggest any limitation as to the scope of use or functionality of the computer and network architectures. Neither should the computing environment 600 be interpreted as having any dependency or requirement relating to any one or combination of components illustrated in the exemplary computing environment 600.

The exemplary detection circumvention may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary detection circumvention may be described in the general context of processor-executable instructions, such as program modules, being executed by a processor. Generally, program modules include routines, programs, objects, components, data structures, etc. that perform particular tasks or implement particular abstract data types. The exemplary detection circumvention may also be practiced in distributed computing environments where tasks are performed by remote processing devices that are linked through a communications network. In a distributed computing environment, program modules may be located in both local and remote computer storage media including memory storage devices.

The computing environment 600 includes a general-purpose computing device in the form of a computer 602. The components of computer 602 may include, by are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media. Such media may be any available media that is accessible by computer 602 and includes both volatile and non-volatile media, removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternatively, the hard disk drive 616, magnetic disk drive 618, and optical disk drive 622 may be connected to the system bus 608 by one or more interfaces (not shown).

The disk drives and their associated processor-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement exemplary computing system and environment.

Any number of program modules may be stored on the hard disk 616, magnetic disk 620, optical disk 624, ROM 612, and/or RAM 610, including by way of example, an operating system 626, one or more application programs 628, other program modules 630, and program data 632.

A user may enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device may also be connected to the system bus 608 via an interface, such as a video adapter 644. In addition to the monitor 642, other output peripheral devices may include components such as speakers (not shown) and a printer 646 which may be connected to computer 602 via the input/output interfaces 640.

Computer 602 may operate in a networked environment using logical connections to one or more remote computers, such as a remote computing device 648. By way of example, the remote computing device 648 may be a personal computer, portable computer, a server, a router, a network computer, a peer device or other common network node, and the like. The remote computing device 648 is illustrated as a portable computer that may include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which may be internal or external to computer 602, may be connected to the system bus 608 via the input/output interfaces 640 or other appropriate mechanisms. It is to be appreciated that the illustrated network connections are exemplary and that other means of establishing communication link(s) between the computers 602 and 648 may be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing device 602, and are executed by the data processor(s) of the computer.

Processor-Executable Instructions

An implementation of an exemplary detection circumvention may be described in the general context of processor-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 6 illustrates an example of a suitable operating environment 600 in which an exemplary detection circumvention may be implemented. Specifically, the exemplary detection circumvention(s) described herein may be implemented (wholly or in part) by any program modules 628-630 and/or operating system 626 in FIG. 6 or a portion thereof.

The operating environment is only an example of a suitable operating environment and is not intended to suggest any limitation as to the scope or use of functionality of the exemplary detection circumvention(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary detection circumvention may be stored on or transmitted across some form of computer readable media. Computer readable media may be any available media that may be accessed by a computer.

By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer storage device having processor-executable instructions that, when executed by a processor, perform acts comprising:
    determining a location in a processor-readable memory where a watermark detector that is a dynamic embedded-watermark signal detection program module receives an input stream to determine if the input stream has an embedded-watermark signal; and
    intervening with embedded-watermark signal detection by the watermark detector by continuously varying an audio sample rate or a video frame rate of the input stream so that the watermark detector receives the input stream at a variable rate.

2. A computer storage device as recited in claim 1, wherein the intervening further comprises introducing a countersignal into the input stream.

3. A computer storage device as recited in claim 1, wherein the intervening further comprises introducing noise into the input stream.

4. A computer storage device as recited in claim 1, further comprising maintaining the intervening of the watermark detection by the watermark detector while the input stream is being consumed.

5. A computer storage device as recited in claim 1, wherein the input stream includes at least one of image, audio, video, multimedia, software, metadata, and data.

6. A computing device comprising:
   an input device for receiving one or more input streams; and
   a computer storage device having processor-executable instructions that, when executed by a processor, perform acts comprising:
      determining a location in a processor-readable memory where a watermark detector that is a dynamic embedded-watermark signal detection program module receives an input stream to determine if the input stream has an embedded-watermark signal; and
      intervening with watermark detection by the watermark detector by continuously varying an audio sample rate or a video frame rate of the input stream.

7. A method facilitating circumvention of embedded-signal detection, the method comprising:
   determining a location in a processor-readable memory where a watermark detector that is a dynamic embedded-watermark signal detection program module receives an input stream to determine if the input stream has an embedded-watermark signal; and
   intervening with embedded-watermark signal detection by the watermark detector by continuously varying an audio sample rate or a video frame rate of the input stream.

8. A method as recited in claim 7, wherein the intervening further comprises introducing a countersignal into the input stream.

9. A method as recited in claim 7, wherein the intervening further comprises introducing noise into the input stream.

10. A method as recited in claim 7, further comprising maintaining the intervening of the watermark detection by the watermark detector while the input stream is being consumed.

11. A method as recited in claim 7, wherein the input stream includes at least one of image, audio, video, multimedia, software, metadata, and data.

12. A computing device comprising one or more processor-readable media having processor-executable instructions that, when executed by the computer, perform the method as recited in claim 7.

13. A system facilitating circumvention of dynamic, robust, embedded-signal detection, the system comprising:
   an input device that receives one or more input streams;
   a memory location determiner that determines a memory location where a watermark detector that is a dynamic embedded-signal detection program module receives an input stream to determine if the input stream has an embedded-watermark signal; and
   an intervention component that intervenes with embedded-watermark signal detection by the watermark detector during a playback of the input stream by continuously varying an audio sample rate or a video frame rate of the input stream so that the watermark detector receives the input stream at a variable rate and providing a counter-signal stream that lacks the embedded-watermark signal to the memory location.

14. A system as recited in claim 13, wherein the memory location determiner further detects and observes the watermark detector in a processor-readable memory of a computer to determine the memory location.

15. A system as recited in claim 13, wherein the intervention components further configured to introduces noise into the input stream.

16. A system as recited in claim 13, wherein the input stream includes at least one of image, audio, video, multimedia, software, metadata, and data.

17. A computer storage device having computer-executable instructions that, when executed by a computer, perform a method for facilitating circumvention of watermark detection, the method comprising:
   determining a memory location in a processor-readable memory where a watermark detector that is a dynamic watermark detection program module receives an input stream to determine if the input stream has a watermark therein;
   observing the watermark detector in the processor-readable memory of a computer to determine the memory location; and
   varying an audio sample rate input stream continuously to hinder watermark detection by the watermark detector.

18. A method for facilitating circumvention of embedded-signal detection, the method comprising:
   observing dynamic detector that is a dynamic embedded-watermark signal detection program module in a processor-readable memory of a computer that dynamically detects watermarks in an input stream;
   based upon the observing, determining a location in the processor-readable memory, where the dynamic detector receives the input stream for the dynamic detector to perform embedded-watermark signal detection thereon to determine if the input stream has an embedded-watermark signal; and
   varying a video frame rate of the input stream continuously to hinder embedded-watermark signal detection by the dynamic detector.

19. A system for facilitating circumvention of dynamic, robust, embedded-signal detection, the system comprising:
   an input device that receives one or more input streams;
   a memory location determiner that determines a memory location in a processor-readable memory where a watermark detector that is an embedded-signal detection program module receives an input stream to determine if the input stream has an embedded-watermark signal; and
   an intervention component that intervenes with embedded-watermark detection by the watermark detector during a playback of the input stream by continuously varying an audio sample rate or a video frame rate of the input stream so that the watermark detector receives the input stream at a variable rate.

* * * * *